United States Patent
Ko et al.

(10) Patent No.: US 7,613,952 B2
(45) Date of Patent: Nov. 3, 2009

(54) METHOD FOR FACILITATING BIOS TESTING

(75) Inventors: Chien-Hsing Ko, Taipei (TW); Chia-I Hsiao, Taipei (TW); Chung-Chien Lin, Taipei (TW)

(73) Assignee: Inventec Corporation, Taipei (TW)

( * ) Notice: Subject to any disclaimer, the term of this patent is extended or adjusted under 35 U.S.C. 154(b) by 398 days.

(21) Appl. No.: 11/648,268

(22) Filed: Dec. 29, 2006

(65) Prior Publication Data

US 2008/0163001 A1 Jul. 3, 2008

(51) Int. Cl.
*G06F 11/00* (2006.01)

(52) U.S. Cl. .............................. 714/36; 714/23; 714/37; 714/38

(58) Field of Classification Search ................... 714/23, 714/25, 36, 37, 3, 47, 488, 38, 48
See application file for complete search history.

(56) References Cited

U.S. PATENT DOCUMENTS

| | | | |
|---|---|---|---|
| 5,850,562 A * | 12/1998 | Crump et al. ............. | 714/38 |
| 7,111,202 B2 * | 9/2006 | Cagle et al. .............. | 714/36 |
| 7,318,173 B1 * | 1/2008 | Falik et al. ............... | 714/36 |
| 7,350,111 B2 * | 3/2008 | Chen ........................ | 714/36 |
| 2004/0153811 A1 * | 8/2004 | Kuo ......................... | 714/36 |
| 2006/0224377 A1 * | 10/2006 | Wang et al. ............... | 703/24 |
| 2007/0101115 A1 * | 5/2007 | Murakami ................. | 713/1 |
| 2008/0141073 A1 * | 6/2008 | Shih et al. ................. | 714/36 |

\* cited by examiner

*Primary Examiner*—Robert Beausoliel
*Assistant Examiner*—Joseph D Manoskey
(74) *Attorney, Agent, or Firm*—Morris, Manning & Martin LLP; Tim Tingkang Xia

(57) ABSTRACT

A method for facilitating basic input and output system (BIOS) testing is provided. In the method, a BIOS program code to be tested is loaded into a memory unit by a BIOS debugging card to execute a boot operation testing. The method of BIOS testing utilizes an uninterruptible power supply memory disposed on the motherboard. The uninterruptible power supply memory is powered with a battery, thus it can store the data of a command in executing during shutdown. By using this characteristic of the uninterruptible power supply memory, the tester can still obtain the debugging code last stored during the previous boot from the uninterruptible power supply memory when rebooting, thus preventing the debugging code generated in the BIOS debugging flow from disappearing due to the abnormal shutdown and resulting in the failure to get the source of the problem for the tester, increasing the efficiency of debugging.

12 Claims, 3 Drawing Sheets

METHOD FOR FACILITATING BIOS TESTING

BACKGROUND OF THE INVENTION

1. Field of Invention

The present invention relates to a method for facilitating basic input and output system (BIOS) testing, and more particularly, to a method applicable to BIOS testing with an uninterruptible power supply memory facilitating the BIOS debugging card.

2. Related Art

In conventional techniques, the most common method used in the BIOS research stage is to insert a BIOS debugging card in the motherboard to display the debugging code. If any problem occurs during the test, the researchers will be aware of the source of the problem from the debugging code, and further trace out the core of the problem.

As shown in FIG. 1, it is a flow chart of a conventional BIOS testing, which comprises the following steps.

Provide a motherboard with a memory unit (step S101). The memory unit is a programmable erasable memory, such as an electrically and erasable programmable read only memory (EEPROM) or an erasable programmable read only memory (EPROM).

Provide a BIOS debugging card inserted in the motherboard (step S102). The BIOS debugging card has a display unit and a test BIOS, wherein the test BIOS will be written into a memory unit of the motherboard after being booted.

Perform a boot task and display the debugging code (step S103). After the test BIOS is written into the memory unit, the BIOS written into the write memory unit will output a debugging code to the BIOS debugging card to be displayed by the unit display, and a boot task corresponding to the debugging code is performed, such that the tester will be aware of the circumstance of the test currently performed.

Determine whether the boot task is completed or not (step S104). If it is YES, end the BIOS debugging task (step S105); if it is NO, the flow is returned to a step of performing a boot task and displaying the debugging code (step S103) so as to display the debugging code corresponding to the incorrect boot task repeatedly, such that the tester will be aware of where the problem lies.

However, if any abnormal circumstance occurs when performing the boot task, such as a breakdown that requires a manual reboot, an automatic shutdown, or an automatic reboot, the debugging code will be cleared such that the tester will not know the source of the errors and the key of the problem, thereby the complexity of the BIOS debugging flow will be increased.

SUMMARY OF THE INVENTION

In view of the above problems, an object of the present invention is to provide a BIOS testing method. The method can prevent the related data of a command of an executed program code from disappearing in the BIOS testing flow due to the circumstances such as an abnormal breakdown that requires a manual reboot, an automatic shutdown, and an automatic reboot, which will make the tester fail to obtain the data of the command in the previous testing for debugging.

Based on the above object, the present invention provides a method for facilitating BIOS testing. In the method, a BIOS program code (such as motherboard boot code) to be tested is loaded into a memory unit of a motherboard by a BIOS debugging card to execute a boot operation testing. The motherboard further includes an uninterruptible power supply memory, and the BIOS program code is composed of plural commands. Besides, the memory may be a complementary metal-oxide semiconductor random access memory (CMOS RAM), which is powered with a battery of the motherboard, thus it can still store data during shutdown.

In the present invention, the BIOS testing method includes the following steps. Store at least a data of a single command from a BIOS program code to be executed in the uninterruptible power supply memory. Execute the stored command in order to proceed a boot operation testing of a motherboard. Therefore, when the testing machine has to be rebooted because of program code error or crash-down by other reasons during the testing, the data executed in previous can be read from the uninterruptible power supply memory (the data, for example, are the command series number, the field number, and the content of a command code and so on), so as to find out which command has an error in order to debug.

Secondly, BIOS debugging card further includes a display unit in order to display the data of the command to be executed in time for tester to monitor and debug. The uninterruptible power supply memory further includes an instant code field, an error code field, and a boot complete bit for storing the data. Hence, when the motherboard BIOS performs a boot task during the debugging process, stores data of the command (debugging code) corresponding to the boot task into the instant code field before performing the boot task, and at the same time outputs the data of the command to the display unit of the BIOS debugging card for displaying the data of the command in execution (such as the command series number, the field number, and the content of the command code), such that the tester will know the command of the boot task performed currently. After the boot task is completed, a boot complete bit is set to indicate that the boot operation has been finished completely and normally without any errors. If any abnormity occurs during the boot task, such as the BIOS data design error, the boot complete bit will not be set so as to indicate that the boot task has not been finished completely, and the data of the command (debugging code) executed in previous corresponding to the boot task will be displayed repeatedly. However, even some severe circumstances occur, such as a breakdown requiring a manual reboot, an abnormally automatic shutdown, and an automatic reboot, by using the characteristic that the uninterruptible power supply memory can store data in an abnormal circumstance, the debugging code will not disappear due to the shutdown.

In addition, the BIOS testing method in the present invention further includes the following steps. Before the boot task is completed, the boot complete bit is set to be a boot incomplete status. When the boot task is done, the boot complete bit is set to be a boot complete status; the boot complete bit is checked. If the boot complete bit is in the boot incomplete status, the data stored on the instant code field is stored to the error code field. However, if the boot complete bit is in the boot complete status, the boot complete bit is cleaned.

By aforementioned steps, no matter whether the previous boot is operated completely or not, the BIOS will check the boot complete bit to see whether it is set or not during each boot. The result of this check will be used for judging whether the previous boot is operated completely or not. If the previous boot is not operated completely, the BIOS stores the numerical value of the instant code field in the error code field, and the value stored in the error code field will be output to the BIOS debugging card after the boot is completed, to be displayed by the display unit. Thus the tester can further get to know where the abnormity or problem has occurred in the previous boot.

Thus, even an abnormally automatic shutdown occurs in the BIOS testing flow, the data stored in the uninterruptible power supply memory will not disappear by using the characteristic that the uninterruptible power supply memory can still store data during the shutdown. Therefore, the tester can obtain the data of commands (debugging code) of the previous boot from the uninterruptible power supply memory when rebooting, and the efficiency of the BIOS program code testing will be dramatically increased.

In order to have a further understanding of the object, the embodiment, and the function of the present invention, the present invention will be illustrated in detail below with accompanied drawings.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below for illustration only for, and which thus is not limitative of the present invention, and wherein.

DETAILED DESCRIPTION OF THE INVENTION

Figure 1:
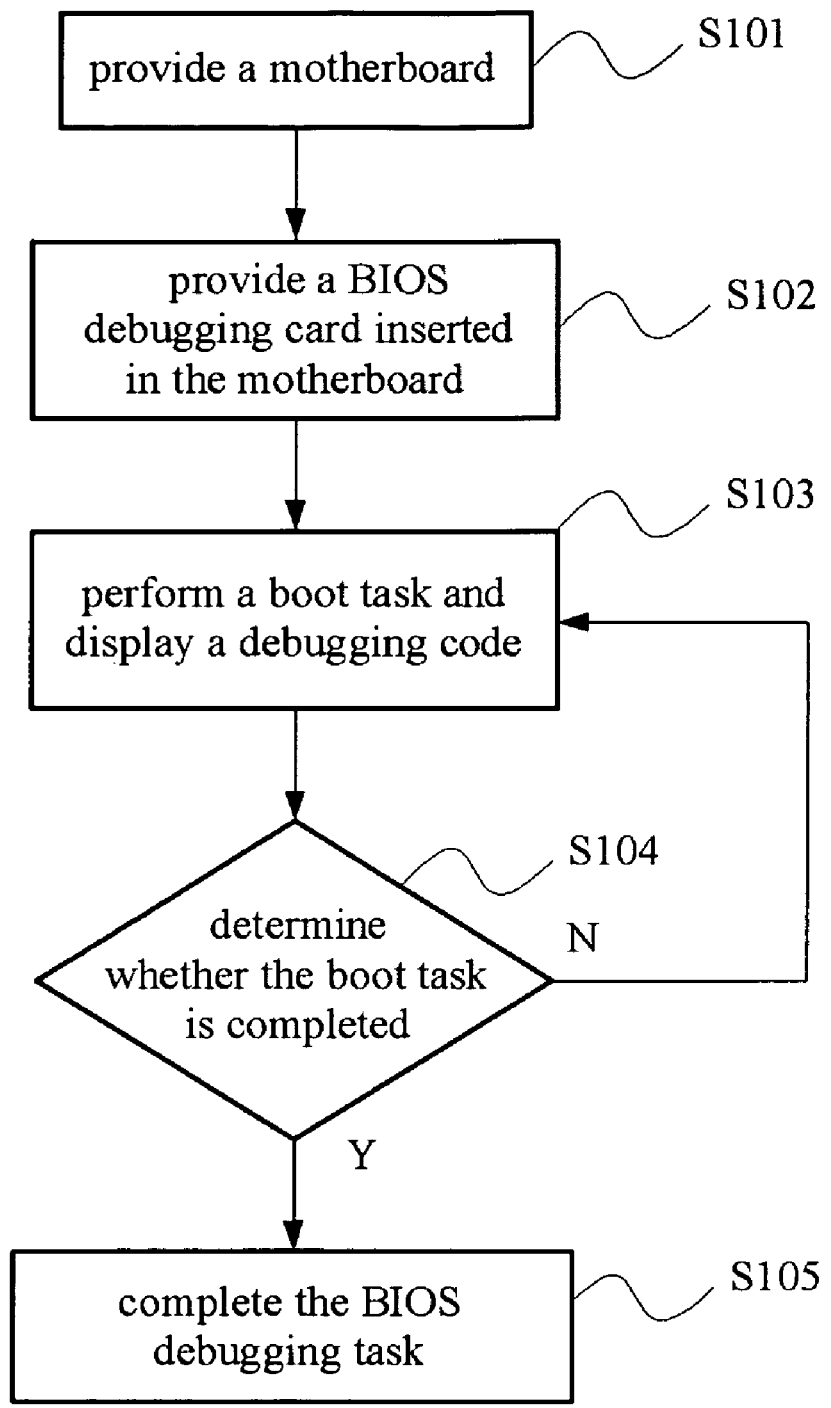
FIG. 1 is a flow chart of a conventional BIOS debug.
Figure 2:
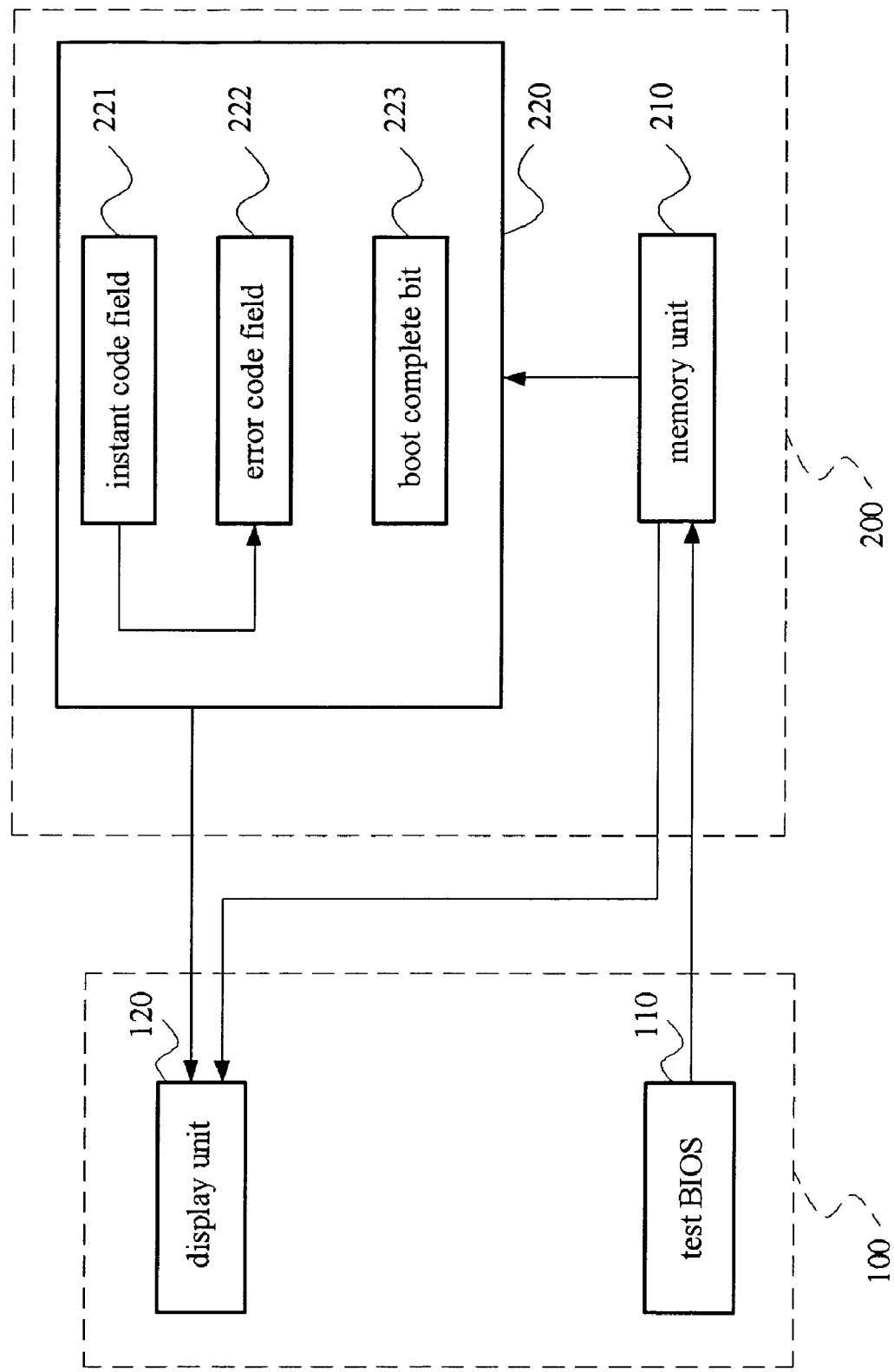
FIG. 2 is a schematic view illustrating the relation between the BIOS debugging card and the CMOS memory according to the present invention.

Referring to FIG. 2, it is a schematic view illustrating the relation between the BIOS debugging card and the CMOS memory according to the present invention. A motherboard 200 having a CMOS memory 220 and a memory unit 210 is provided. The CMOS memory 220 has an instant code field 221 for storing a debugging code in the BIOS debugging process, a boot complete bit 223 for judging whether the previous boot is successful or not in the BIOS debugging flow, and an error code field 222 for storing a numerical value of the instant code field when the previous boot is not successful. A BIOS debugging card 100 inserted in the motherboard 200 is further provided, which comprises a test BIOS 110 and a display unit 120 for displaying the debugging code.

The test BIOS 110 is written into the memory unit 210 first at the beginning of the debugging flow for controlling the circuits of the motherboard 200 and for accessing the CMOS memory 220. The CMOS memory 220 may be a complementary metal-oxide semiconductor random access memory (CMOS RAM), which is powered with a battery of the motherboard 200 to maintain a small volume memory unit for storing data. The memory unit 210 is an electrically and erasable programmable read only memory (EEPROM) or an erasable programmable read only memory (EPROM). The display unit is a liquid crystal screen or a seven-segment display.

Figure 3:
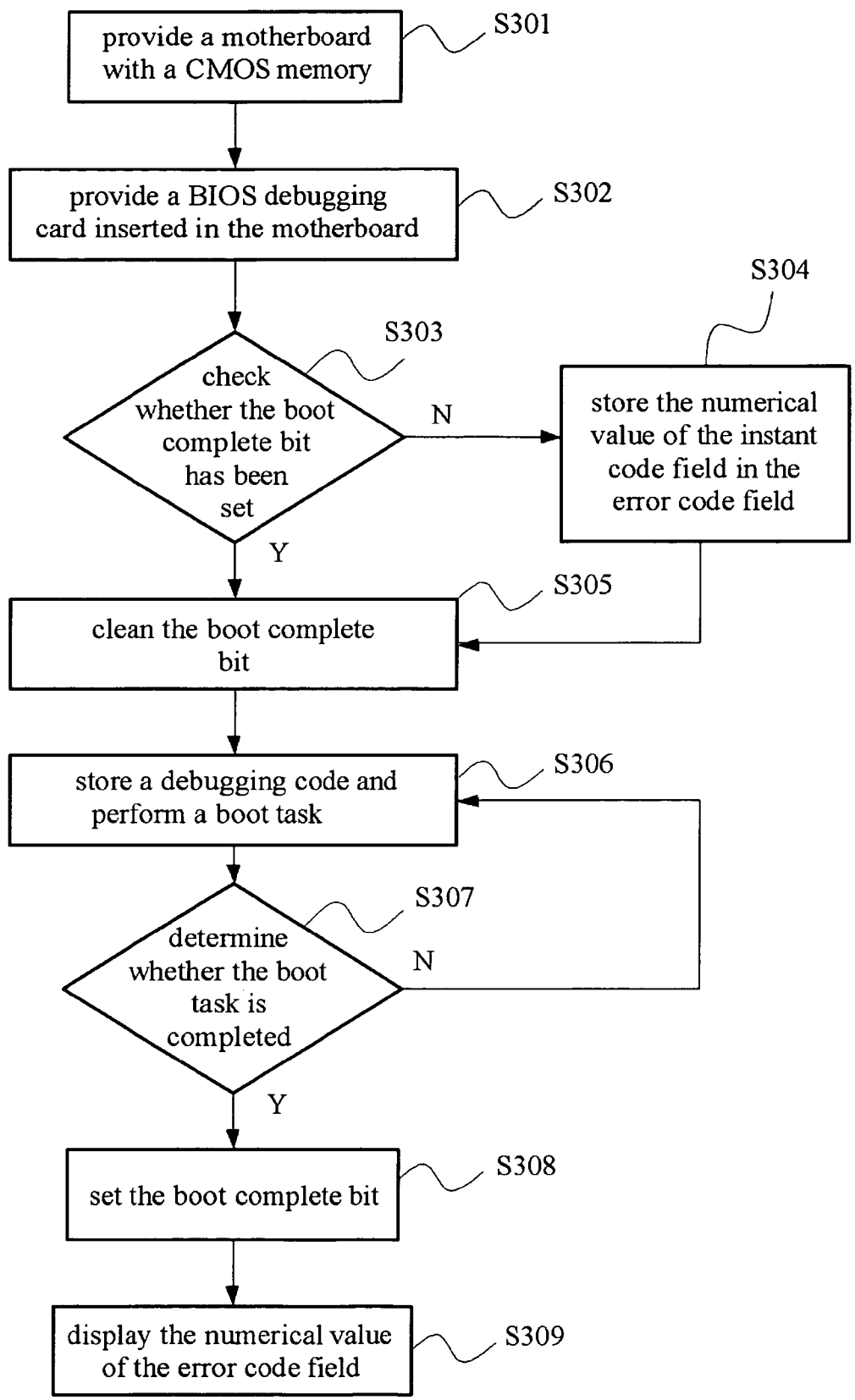
FIG. 3 is a flow chart of the BIOS debugging according to the present invention.

Referring to FIG. 3, it is a flow chart of BIOS debugging according to the present invention, which comprises the following steps.

Provide a motherboard with a CMOS memory (step S301). A motherboard 200 with a CMOS memory 220 is provided, wherein the CMOS memory 220 has a plurality of data fields, at least having an instant code field 221, an error code field 222, and a boot complete bit 223.

Provide a BIOS debugging card inserted in the motherboard (step S302). A BIOS debugging card 100 is inserted in the motherboard 200, wherein the BIOS debugging card 100 has a display unit 120 and a test BIOS 110. The data of the test BIOS 110 will be written into the memory unit 210 to form a motherboard BIOS for controlling the circuits of the motherboard 200 and for accessing the CMOS memory 220.

Check whether the boot complete bit has been set or not (step S303). The motherboard BIOS will judge whether the previous boot is completed by checking whether the boot complete bit has been set or not. If it is NO, the motherboard BIOS will store the numerical value of the instant code field 221 in the error code field 222 (step S304) and then clear the boot complete bit (step S305). If it is YES, the motherboard BIOS will clear the boot complete bit directly (step S305).

Store a debugging code and perform a boot task (step S306). The motherboard BIOS will perform the boot task first, store the debugging code corresponding to the boot task into the instant code field 221 before performing the boot task, and meanwhile output the debugging code to the BIOS debugging card 100 to be displayed by the display unit 120.

Determine whether the boot task is completed or not (step S307). After completing the boot task, the motherboard BIOS will judge whether the boot task is operated completely. If it is NO, a step of storing a debugging code and performing a boot task is carried out (step S306), such that the debugging code corresponding to an incorrect boot task is displayed to make the tester be aware of where the problem lies. If it is YES, the boot complete bit is set (step S308) to indicate that the boot task has been operated completely without any errors.

Finally, display the numerical value of the error code field (step S309). The motherboard BIOS will output the numerical value of the error code field 222 to the BIOS debugging card 100, to be displayed by a display unit 120. The numerical value of the error code field 222 is the debugging code last stored during the previous failed boot or breakdown.

From the above description, the tester can obtain the debugging code directly from the display unit of the BIOS debugging card during the BIOS debugging flow. Even an abnormal breakdown or an automatic shutdown occurs in the debugging flow, the debugging code last stored during the previous boot can still be obtained when rebooting due to the characteristic that the CMOS memory can store data in an abnormal circumstance, thus the tester will be aware of where the problem lies and thereby the source of the problem can be found out.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for facilitating basic input and output system (BIOS) testing, by loading a BIOS program code to be tested into a memory unit of a motherboard by a BIOS debugging card to execute a boot operation testing, the motherboard further including an uninterruptible power supply memory, the BIOS program code being composed of a plurality of commands, the method comprising:

storing a data of one of the commands from the BIOS program code to be executed in the uninterruptible power supply memory; and executing the stored command to proceed the boot operation testing of the motherboard, wherein the uninterruptible power supply memory includes an instant code field, an error code field, and a boot complete bit for storing the data, the BIOS testing further comprising:

setting the boot complete bit to be a boot incomplete status before the boot task being complete; and checking the boot complete bit, if the boot complete bit being in the boot incomplete status, the data stored on the instant code field being stored to the error code field.

2. The method for facilitating BIOS testing as claimed in claim 1, wherein the uninterruptible power supply memory is a complementary metal-oxide semiconductor random access memory (CMOS memory) power-supplied by a battery.

3. The method for facilitating BIOS testing as claimed in claim 1, wherein the stored data is a command series number.

4. The method for facilitating BIOS testing as claimed in claim 1, wherein the stored data is a command code.

5. The method for facilitating BIOS testing as claimed in claim 1, wherein the BIOS program code is a motherboard boot program code.

6. The method for facilitating BIOS testing as claimed in claim 1, wherein the BIOS testing further comprising:

setting the boot complete bit to be a boot complete status when the boot task being completed; and checking the boot complete bit, if the boot complete bit being in the boot complete status, the boot complete bit being cleaned.

7. The method for facilitating BIOS testing as claimed in claim 6, wherein the BIOS debugging card further including a display unit, the BIOS testing further comprising:

displaying data of the command to be executed in the display unit.

8. The method for facilitating BIOS testing as claimed in claim 7, wherein the BIOS testing further comprising:

displaying the data stored on the error code field from the display unit when re-executing the boot operation testing and the boot complete bit being in the boot incomplete status.

9. The method for facilitating BIOS testing as claimed in claim 8, wherein the uninterruptible power supply memory is a complementary metal-oxide semiconductor random access memory (CMOS memory) power-supplied by a battery.

10. The method for facilitating BIOS testing as claimed in claim 9, wherein the stored data is a command series number.

11. The method for facilitating BIOS testing as claimed in claim 9, wherein the stored data is a command code.

12. The method for facilitating BIOS testing as claimed in claim 9, wherein the BIOS program code is a motherboard boot program code.

* * * * *